J. H. & H. J. HEINZ.
Vegetable Assorters.

No. 212,849.  Patented Mar. 4, 1879.

WITNESSES:
J. B. Geyser,
Edw. C. Upstill

INVENTORS:
John H. Heinz
Henry J. Heinz
By John W. Hague
ATTORNEY

UNITED STATES PATENT OFFICE.

JOHN H. HEINZ, OF SHARPSBURG, AND HENRY J. HEINZ, OF PITTSBURG, PENNSYLVANIA.

IMPROVEMENT IN VEGETABLE-ASSORTERS.

Specification forming part of Letters Patent No. 212,849, dated March 4, 1879; application filed May 17, 1878.

*To all whom it may concern:*

Be it known that we, JOHN H. HEINZ, of Sharpsburg, and HENRY J. HEINZ, of Pittsburg, both in the county of Allegheny and State of Pennsylvania, have invented a new and useful Improvement in Apparatus for Assorting Pickles; and we do hereby declare that the following is a full and exact description thereof, reference being had to the accompanying drawings, and to the letters of reference marked thereon.

Our invention relates to an improvement in apparatus for assorting pickles; and consists of a hopper mounted on rollers and having a vibrating motion, combined with a separator, consisting of two or more series of slats, one above the other, contained in a frame or box, also mounted on rollers and having a vibrating motion, the whole being so arranged that the different sizes of pickles are assorted and delivered to separate receptacles by aid of the spouts combined with the vibrating separator.

Figure 1:
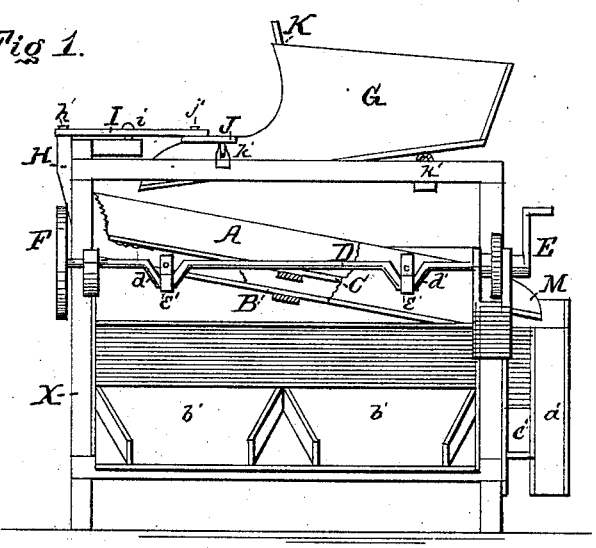
Figure 2:
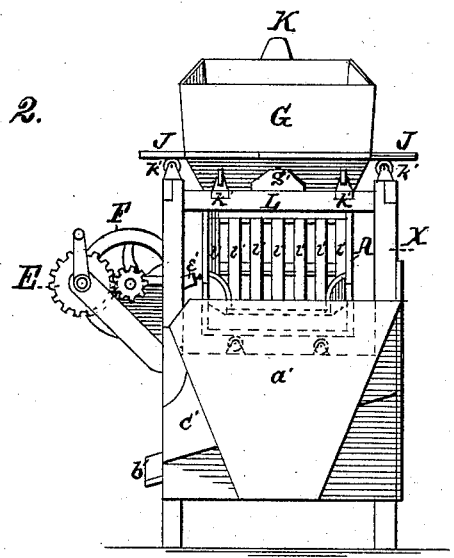

In the drawings, Figure 1 is a side view, partly in section. Fig. 2 is an end view.

The assorter is composed of a suitable frame, X, to and on which all the other parts are attached. G is the hopper, for the reception of the pickles. It is pivoted on the top of the frame at $g'$, Fig. 2. Crossing the spout of the hopper is the supporting-piece J J, each end of which rests on a friction-roller, $k'$ $k'$, fastened to the top of the frame. On each side of the pivot $g'$ is a similar friction-roller, $k'$ $k'$, fastened to the cross-bar L of the frame, thus permitting a safe and easy vibration of the hopper.

K is an ordinary slide-gate, to regulate the flow of the pickles to the assorter.

The vibration or shaking of the hopper is accomplished by the lever I, which is pivoted at $i'$ to a projection of the frame. It moves the hopper by the pin $j$, set in J, and itself receives motion from the pin $h'$, set in the top of the upright H, which is fastened to the rear end of the assorter A and moves with it.

A is the body of the assorter, in the form of an open box. It is placed between the uprights of the frame, and is supported by cross-bars on the frame at each end, on which are friction-rollers, upon which A moves. The whole is so arranged as to give A an incline from the rear to the front or discharging end.

Motion is communicated by the crank-wheel and pinion E to the shaft D, having the cranks $d'$ $d'$ and balance-wheel F. A receives a shaking or vibrating motion therefrom by the hinged connecting-arms $e'$ $e'$, and by the upright H conveys the same to the hopper G.

In the bottom of A are placed one or more series of bars or slats having graduated spaces between, for the passage of different sizes of pickles. In the present instance there are two such series. The bars are shown at $l'$ $l'$ $l'$, Fig. 2. Of these, B allow the passage of the smallest size or grade of pickles, which fall into the receptacle below, and are discharged by the spouts $b'$ $b'$. C admits of the passage of an intermediate grade, which, after being cleaned of the smallest size by B, are discharged by the spout $c'$, while the largest size are retained on the bars of C, and discharged, by the projection M, through the spout $a'$.

Thus the pickles placed in the hopper G are discharged by its motion upon the rear end of the assorter A, the flow being regulated by the slide-gate K, and are assorted, by the series of bars C and B, into their different grades, and drop into any vessel placed to receive them through their respective spouts.

There is a great saving of time and labor by the use of this machine, while the results are more uniform.

Having thus described the nature, construction, and operation of our improvement, what we claim as our invention is—

The hopper G, pivoted to the frame-work at its rear end, resting on friction-roller, and vibrated laterally by means of the pivoted lever I and upright H, attached to the assorter A, substantially as and for the purposes herein set forth.

JOHN H. HEINZ.
HENRY J. HEINZ.

Witnesses:
EDWD. C. UPSTILL,
R. B. PETTY.